United States Patent [19]
Torti et al.

[11] 3,712,360
[45] * Jan. 20, 1973

[54] PRODUCTION OF COMPOSITE VEHICLE TIRES BY COVULCANIZATION OF LAYERS OF OLEFIN TERPOLYMERS AND NATURAL RUBBER

[75] Inventors: Luigi Torti, Monza; Guido Bertelli, Ferrara, both of Italy

[73] Assignee: The B. F. Goodrich Company, New York, N.Y.

[*] Notice: The portion of the term of this patent subsequent to May 25, 1988, has been disclaimed.

[22] Filed: Nov. 2, 1970

[21] Appl. No.: 86,269

Related U.S. Application Data

[63] Continuation of Ser. No. 649,039, June 26, 1967, Pat. No. 3,580,800.

[30]  Foreign Application Priority Data

| Date | Country | Number |
|---|---|---|
| June 28, 1966 | Italy | 14823/66 |
| June 27, 1967 | Canada | 994063 |
| June 27, 1967 | France | 112,041 |
| June 26, 1967 | Great Britain | 29,397/67 |
| June 27, 1967 | Japan | 40/40812 |
| June 23, 1967 | Germany | P 16 94 628.4 |

[52] U.S. Cl. ............. 152/354, 152/109, 152/357, 156/101, 156/128 T, 156/333, 161/243, 161/254, 161/256, 260/338, 260/41.5, 85.3 H

[51] Int. Cl. .................................. C09j 3/12

[58] Field of Search...156/128 T, 333; 161/254, 256, 161/243; 152/355, 209, 357, 354; 260/33.8 R, 41.5 R, 85.3 H

[56]  References Cited

UNITED STATES PATENTS

| | | | |
|---|---|---|---|
| 3,009,904 | 11/1961 | Sernick et al | 260/85.3 |
| 3,058,859 | 10/1962 | Amberg | 156/128 T |
| 3,580,800 | 5/1971 | Torti et al | 156/333 |

*Primary Examiner*—Robert F. Burnett
*Assistant Examiner*—C. B. Cosby
*Attorney*—Hubbell, Cohen & Stiefel

[57]  ABSTRACT

Process for bonding (1) vulcanizable composition comprising low-unsaturation ethylene/higher alpha-olefin/unconjugated diolefin terpolymer, a vulcanizing agent therefor and carbon black with (2) vulcanizable composition comprising natural rubber, a vulcanizing agent therefor and carbon black, this process comprising interposing between layers of compositions (1) and (2) a layer of (3) vulcanizable composition comprising a brominated copolymer of isobutene with about 0.5 – 5 percent by weight of isoprene, a vulcanizable agent therefor and carbon black, the carbon black in composition (3) having a lower activity than the carbon black in layers (1) and (2), contacting the three layers under pressure, and then heating at a temperature of 130°–210° C to thereby covulcanize the three layers and obtain a high degree of adhesion therebetween.

4 Claims, No Drawings

PRODUCTION OF COMPOSITE VEHICLE TIRES BY COVULCANIZATION OF LAYERS OF OLEFIN TERPOLYMERS AND NATURAL RUBBER

CROSS-REFERENCE TO RELATED APPLICATION

This application is a continuation of our co-pending application Serial No. 649,039 filed June 26, 1967 now U.S. Pat. No. 3,580,800.

BACKGROUND OF THE INVENTION

1. Field of the Invention

The present invention relates to a process for bonding terpolymers of ethylene, an alpha-olefin and a cyclic or acyclic polyene containing non-conjugated double bonds to natural rubber, and to the thus obtained vulcanizates.

2. Description of the Prior Art

It is often desirable to combine the excellent dynamic properties (low elastic hysteresis, high rebound elasticity) of natural rubber with the characteristics of higher resistance to abrasion, ageing and to the action of chemical agents, characteristic of some new low-unsaturation synthetic rubbers, namely amorphous, elastomeric terpolymers of ethylene with propylene or another higher alpha-olefin and a cyclic or acyclic unconjugated diene.

Such a combination of properties is obtained, for example, by manufacturing or retreading of tires having a composite structure, in which the carcass is composed of natural rubber or other unsaturated rubber showing low elastic hysteresis and high elasticity and the tread is composed of a low-unsaturation elastomeric terpolymer.

The structure of these new elastomers, which is substantially different from that of diene rubbers, generally speaking, makes it difficult to obtain adhesion between layers of the two materials, both because of their different polarity and because of the relative incompatibility between the different rubbers and their respective curing systems.

Diene rubbers are usually vulcanized with sulfur and conventional type accelerators such as N-cyclohexyl-2-benzothiazolesulfonamide, while low-unsaturation terpolymers of ethylene with an alpha-olefin and an unconjugated diene generally require curing systems comprising sulfur and "ultrarapid" accelerators such as mercaptobenzothiazole and tetramethylthiuramdisulfide in order to be vulcanized. However, these accelerators, in the presence of highly unsaturated diene rubbers, are preferentially consumed by the highly unsaturated diene rubber (e.g., natural rubber) in the contact zone between the layers of the highly unsaturated rubber and the low-unsaturation terpolymer. For this reason, the low-unsaturation terpolymer is not vulcanized satisfactorily in this area of contact between the two layers and, as a consequence, the mechanical characteristics thereof are impaired and no adhesion takes place.

Moreover, physical incompatibility between the two different rubbers, even when they have the same vulcanizing agents, results in the detaching of the two different layers brought into contact and vulcanized simultaneously under pressure this detaching occurring spontaneously or under a small load. A test which can be easily carried out in order to establish the compatibility between two rubbers, suggested by VOYUTSKIJ ("Autoadhesion and adhesion of high polymers" by S.S. Voyutskij, Interscience Publ. New York, 1953, page 141) consists of mixing and stirring in a tube at room temperature identical volumes of 10 percent solutions of the two rubbers in a hydrocarbon solvent (heptane, benzene, etc.). The mixture is then allowed to stand; the formation of two separate layers shows incompatibility between the two elastomers. When this test is applied for instance to a 10 percent solution of natural rubber and a 10 percent solution of terpolymer consisting of ethylene, propylene and unconjugated diolefin (e.g., hexadiene-1,4, 5-methyl-tetrahydroindene, dicyclopentadiene, cyclooctadiene-1,5 etc.) in benzene, the formation of two separate liquid layers is observed.

In French Patent No. 1,418,478, a method has been proposed whereby it was possible to obtain adhesion between a layer of diene rubber and a layer of low-unsaturation olefinic terpolymer, provided that in the former a white mineral filler of siliceous type was present and the latter had a Mooney viscosity above 60. In this case, it was possible to use conventional vulcanization compositions for both layers and to extend the terpolymer having a high Mooney viscosity with, for example, mineral oils, so that it could be more easily worked.

However, this system was limited in that only white mineral fillers could be used in the diene rubber (which fillers, as is known, give poor reinforcement). In addition, while the adhesion so obtained was statically efficient, it had poor resistance to dynamic stresses and to heat.

According to a method described in Belgian Patent No. 667,148, it was proposed that adhesion between the mentioned elastomers could be obtained without limiting the molecular weight of the terpolymer, but a siliceous mineral filler always had to be present in the diene rubber composition. In addition, the amount and nature of the curing agents in the two layers had to be selected in such a way as to obtain an identical vulcanization starting time for the two compositions, this time being higher than 2 seconds. However, this method, too, is subjected to the above mentioned limitation, namely, black reinforcing fillers cannot be used in the natural rubber composition.

It was also known that it is possible to obtain adhesion between a layer of natural rubber and a layer of butyl rubber (isobutylene copolymer containing 0.5 – 5 percent isoprene) provided that in one of the two layers to be coupled a silica-based filler is present and the butyl rubber is previously chlorinated up to a chlorine content of between 0.8 and 1.5 percent by weight. It was also known that, especially when halogenated, butyl rubber can vulcanize in admixture with ethylene-propylene-unconjugated diolefin terpolymers.

All these processes, however, did not enable, and on the contrary in some cases they specifically excluded the possibility of, coupling layers of unsaturated terpolymers with layers of natural rubber when both layers contained black reinforcing fillers.

SUMMARY OF THE INVENTION

It has now been found that it is possible to couple layers of highly unsaturated diene rubber with layers of low-unsaturation olefinic terpolymers, both layers containing black reinforcing fillers (which fillers afford an appreciably higher reinforcement) by interposing between the above mentioned layers an inter-layer made up of an elastomer compatible with both rubbers and by suitably selecting the types of carbon black for use in the three compounds.

More particularly, the present invention provides a process for bonding (1) vulcanizable composition comprising a low-unsaturation ethylene/higher alpha-olefin/unconjugated diolefin terpolymer, a vulcanizing agent therefor and carbon black with (2) a vulcanizable composition comprising natural rubber, a vulcanizing agent therefor and carbon black, this process comprising interposing between layers of compositions (1) and (2) a layer of (3) a vulcanizable composition comprising a brominated copolymer of isobutene with about 0.5 – 5 percent by weight of isoprene, a vulcanizing agent therefor and carbon black, the carbon black in composition (3) having a lower activity than the carbon black in layers (1) and (2), contacting the three layers and then heating, under pressure, at a temperature of 130° – 210° C to thereby covulcanize the three layers and obtain a high degree of adhesion therebetween.

DESCRIPTION OF THE PREFERRED EMBODIMENTS

Thus, we have found, in accordance with the above mentioned Voyutskij method, that brominated butyl rubber is compatible with both natural rubber and low-unsaturation olefinic terpolymers.

However, to obtain good adhesion between two layers of different and compatible rubbers, in accordance with the present invention, the black filler of more active type should be present in the layer of the rubber in respect to which the filler is less active.

The concept of activity of a black filler (carbon black of various types, e.g., "furnace," "channel," "thermal" structure. For the purposes of the present invention, we have found it convenient to define the activity of carbon black in quantitative terms referred to the gelation power of the filler with the rubber. The gelation degree is, in practice, determined as follows:

100 parts by weight of rubber and 50 parts by weight of a specific carbon black are mixed on a roll mixer at 40° – 50° C for 15 minutes. The mixture is then subjected to extraction with a solvent for rubber (such as a hydrocarbon or halogenated hydrocarbon solvent, for example, benzene, heptane, toluene, xylene, carbon tetrachloride, chlorobenzene, etc.) in a reflux extractor, e.g., of the Kumagawa type, until the residue has reached constant weight. The residue is then vacuum dried in an oven at 70° – 80° C.

The gelation degree is given by the formula:

$$\% \text{ gel} = R-C/R \cdot 100$$

where $R$ is the weight of the insoluble residue and $C$ the weight of the filler contained therein (which filler is not extracted by the solvent).

It has been found that with a fair approximation the gelation degree is independent of the type of solvent which is used. By determining, in accordance with the above method, the gelation degrees of a series of carbon blacks with respect to the three rubbers to be coupled in accordance with the present invention (the various olefinic terpolymers show more or less constant values), the following values were found (using heptane as the solvent):

| Type of carbon black | MT | SRF | FEF | HAF | ISAF | EPC | HiSil* |
|---|---|---|---|---|---|---|---|
| Natural rubber (smoked sheet) ML(1+4) 100° C.=40 | 9.5 | 18 | 24.5 | 28 | 40 | 42.5 | 28.5 |
| Brominated (2.35% by wt.) isobutene/isoprene copolymer** ML (1+4) 100° C.=45 | 16 | 31 | 39.5 | 51 | 52 | 60 | 51 |
| Ethylene/propylene (47% by mols)/5-methyltetrahydroindene (3.5% by mols) terpolymer ML(1+4) 100° C.=80 | 3.5 | 6 | 8.5 | 13 | 14.5 | 15 | 13 |

*For comparison purposes, the relative values for HiSil silicic acid are also reported.
**Hycar 2202=commercial product of B. F. Goodrich.

From these values, it can be seen that the listed blacks are given according to increasing order of activity and that the relative scale of activity is identical for the three rubbers. Each carbon black exhibits the lowest activity with the low-unsaturation terpolymer and the highest activity with brominated butyl rubber.

Apart from the requirement concerning the relative activity of the filler used in the brominated copolymer composition of the interlayer, the selection of the fillers for use in the compositions of the outside layers is not subjected to any other limitation and the fillers can also be the same in the two outer layers.

The preferred terpolymers which are coupled with natural rubber in accordance with the present invention are copolymers containing 30 – 70 percent by mols of propylene and 0.5 – 10 percent by mols of an unconjugated cyclic or acyclic diolefin having a Mooney viscosity of 20 to 120. These copolymers may be obtained by copolymerizing ethylene, propylene and a non-conjugated diolefin, with the aid of soluble or insoluble catalysts obtained by reaction between a compound of a transition metal of Group IV, V or VI of the Periodic Table (preferably titanium or vanadium compounds) and organometallic compound of a metal of Group I, II or III of the Periodic Table (particularly metal alkyls or aluminum alkylhalides) at temperatures varying from −80° to +100° C, with or without a solvent, according to processes known in the art. Suitable non-conjugated cyclic or acyclic diolefins include cyclopentadiene; dicyclopentadiene; 2-methyl-pentadiene-1,4; hexadiene-1,4; cyclooctadiene 1,5; 5-methyl-tetrahydro-(3a, 4, 7, 7a)-indene; 2-methylen-5-norbornene; norbornadiene; hexadiene-1,5; heptadiene-1,6; cyclododecatriene-1,5,9 and the like.

The brominated butyl rubber used in the interlayer is made up of an isobutene copolymer containing 0.5 – 5 percent isoprene, obtained by cationic polymerization with the aid of Friedel-Crafts catalysts, preferably aluminum halides, at relatively low temperatures, preferably below −5° C. It is further brominated, according to known techniques, by means of treatments with bromine in solution or with dry bromine up to a bromine content ranging from 1 to 6 percent by weight. A commercial product of this type is known as Hycar 2202 (registered trade mark of B.F. Goodrich). Usually, the interlayer consists of a thin sheet having a thickness of from about 0.5 millimeter to about 3 millimeters and comprises a mixture of brominated butyl rubber, filler and curing agents.

In some cases, this composition may also be dispersed in a solvent and applied like a rubbery adhesive in one or more applications on one, or preferably both surfaces of the two remaining rubbers to be coupled.

Although the invention has been described using, as the reinforcing fillers, carbon blacks of commercially known types which afford improved mechanical and dynamic characteristics, the present invention can also be applied when one or more of the vulcanizable compositions contain mineral fillers, provided that the principle of the relationship existing between the activities of the fillers in the various layers, measured on the basis of their gelation degree, is complied with. That is, the filler having the highest relative activity has to be incorporated in the rubber with respect to which it shows the lowest activity.

The present invention thus allows a much wider latitude, as compared with the preceding methods, for obtaining adhesion between natural rubber and a low-unsaturation olefinic terpolymer. By suitably selecting the reinforcing fillers, one can in turn give prominence to the desired characteristics, such as resistance to abrasion, hardness, tensile strength losses due to dynamic hysteresis, etc. in connection with the various applications.

The reinforcing fillers are generally used in amounts varying from 30 to 200 parts by weight per 100 parts rubber with which they are mixed.

EXAMPLE 1

To show the influence exerted by the type of filler (namely its relative gelation degree) on adhesion values, a series of bondings were run in which the filler of one layer was kept constant while the filler of the other coupled layer was varied.

Compositions comprising, respectively, natural rubber, brominated isobutene-isoprene copolymer and terpolymer of ethylene, propylene and 5-methyl-tetrahydroindene were placed into a conventional mixer. These compositions are set forth in Table 1, the amounts being set forth in parts by weight.

TABLE 1

| Composition | A | B | C |
|---|---|---|---|
| Natural rubber (smoked sheet) ML(1+4) 100° C.=40 | 100 | | |
| Brominated (2.35% wt.) isobuteneisoprene copolymer ML(1+4) 100° C.=45* (residual unsaturation=1%) | | 100 | |
| Ethylene/propylene (47% by mols)/5-methyltetra-hydroindene (3.5% by mols) terpolymer ML(1+4) 100° C.=80 | | | 70 |
| Branched polyalkylbenzenes** | | | 30 |
| Carbon black of variable type (see Table 2) | 50 | 50 | 50 |
| Zinc oxide | 5 | 5 | 5 |
| Stearic acid | 1 | 1 | 0.5 |
| Phenylbetanaphthylamine | 1 | 1 | 1 |
| Mercaptobenzothiazole | | 1 | 0.5 |
| Tetramethylthiuramdisulfide | | 1 | 1 |
| N-cyclohexyl-2-benzothiazol-sulfonamide | 1.2 | | |
| Sulfur | 2.5 | 2 | 2 |

*HYCAR 2202=commercial product of B.F. Goodrich.
**Preadix 8=commercial product by I.C.I.R.

From these compositions, 3 mm thick sheets of 16 × 8 cm dimensions were obtained, which were then utilized to form specimens for binary coupling. The external surfaces of these plates were reinforced with a square cloth (warp = 25 filaments/cm; weft: 9 filaments/cm), and then the sheets to be bonded together were brought into surface to surface contact and vulcanized in a press at 150° C for 60 minutes. From the thus obtained vulcanizates, specimens suitable for the determination of adhesion values were obtained.

Table 2 presents the adhesion values for the binary couplings of the composition comprising brominated butyl rubber with the compositions comprising natural rubber and a terpolymer, respectively, as a function of the different types of carbon black used as reinforcing fillers.

TABLE 2

| Coupling | | Adhesion, kg./cm. | | Coupling | | Adhesion, kg./cm. | |
|---|---|---|---|---|---|---|---|
| Composition A | Composition B | | | Composition B | Composition C | | |
| Type of carbon black | | 25° C. | 90° C. | Type of carbon black | | 25° C. | 90° C. |
| HAF | MT | *21 | *9 | MT | HAF | *17 | *8.5 |
| HAF | SRF | *23 | *12 | SRF | HAF | *23 | *12 |
| HAF | FEF | 10 | 3.5 | FEF | HAF | 10.5 | 5.5 |
| HAF | HAF | 6 | 2.5 | HAF | HAF | 6 | 3 |
| HAF | ISAF | 2.5 | 0.8 | ISAF | HAF | 1.5 | 1.5 |

* The value of rubber to rubber coupling measured by the peeling method of ASTM D-413/39 is higher than the shear strength of either vulcanized composition.

The adhesion values obtained by keeping constant the type of carbon black used as reinforcing filler in one composition while, in the other composition contacted therewith, the type of carbon black varies from less to more active carbon blacks, permit determination of the types of reinforcing filler which must be employed to obtain an optimum adhesion in accordance with the present invention.

EXAMPLE 2

Compositions as set forth in Table 3 were prepared as described in Example 1.

Rectangular 3 mm thick sheets having an area of 16 × 8 cm² were obtained from compositions A, B, C, and F. Sheets D and E were 0.8 mm thick and of the same area as sheets A, B, C, and F.

Couplings were assembled as set forth in Table 4 and vulcanized in a press at 160° C for 30 minutes. From the vulcanized structures, specimens for the adhesion

TABLE 3

|  | A | B | C | D | E | F |
|---|---|---|---|---|---|---|
| Natural rubber (smoked sheet) ML (1+4) 100° C.=40 | 100 | 100 | 100 |  |  |  |
| Brominated (2.35% wt.) isobutene-isoprene copolymer (Hycar 2202) ML (1+4) 100° C.=45 (residual unsaturation=1%) |  |  |  | 100 | 100 |  |
| Ethylene/propylene (44 mol percent)/5-methyltetrahydroindene (4 mol percent) terpolymer, ML (1+4) 100° C.=100 |  |  |  |  |  | 65 |
| Branched polyalkyl benzenes (Preadix 8) |  |  |  |  |  | 35 |
| MT carbon black |  |  |  | 50 |  |  |
| SRF carbon black |  | 50 |  |  |  |  |
| HAF carbon black |  |  | 50 |  | 50 |  |
| Hydrated silica |  |  |  |  | 50 |  |
| ISAF carbon black |  |  |  |  |  | 55 |
| Zinc oxide | 5 | 5 | 5 | 5 | 5 | 5 |
| Magnesium oxide |  |  |  | 5 | 5 |  |
| Stearic acid | 1 | 1 | 1 | 1 | 1 | 0.5 |
| Phenylbetanaphthylamine | 1 | 1 | 1 | 1 | 1 | 1 |
| Mercaptobenzothiazol |  |  |  | 0.5 | 0.5 | 0.5 |
| Tetramethylthiuram disulfide |  |  |  | 1 | 1 | 1 |
| N.-cyclohexyl-2-benzothiazolesulfonamide | 1.2 | 1.2 | 1.2 |  |  |  |
| Sulfur | 2.5 | 2.5 | 2.5 | 2.5 | 2.5 | 2 | tests were obtained. The adhesion values are reported in Table 4.

For comparison purposes, there are also reported the adhesion values between natural rubber and terpolymer without the interlayer sheet D or E.

TABLE 4

|  | Adhesion in kg./cm. | |
|---|---|---|
| Coupling | 25° C. | 90° C. |
| A-F | 6 | 2.5 |
| B-F | 4 | 1.7 |
| C-F | 4 | 1.7 |
| A-D-F | *12 | 6.3 |
| B-D-F | *19 | *8.5 |
| C-D-F | *21 | *10 |
| A-E-F | 6.5 | 2.5 |
| B-E-F | 5 | 1.75 |
| C-E-F | 5 | 2 |
| A-D-E | 2.1 | 1 |
| B-D-E | 2.2 | 0.9 |
| C-D-E | 2.5 | 1.1 |

*The value of the rubber-rubber adhesion is higher than the tear strength of either vulcanized composition.

EXAMPLE 3

Tires of composite structure were assembled wherein the carcass was composed of natural rubber and the tread of ethylene/propylene (44 percent by mols)/5-methyletetrahydro-indene (4.0 percent by mols) terpolymer having Mooney viscosity ML(1+4) 100° C = 100, extended with oil (Preadix 8) in the proportion of 65 parts by weight of terpolymer and 35 parts by weight of the oil.

The tires were made as follows:
1. The carcass was prepared by laying plies coated with natural rubber composition B (see Table 5) on the cylinder of a tire manufacturing machine. The top ply was coated with composition A of Table 5.
2. The tread portion was prepared by laying a 1 mm thick sheet of composition C of Table 5 on the internal surface of the tread layer of composition D of Table 5, after first wetting the opposing surfaces with heptane. A 1 mm thick sheet of composition A was then placed over the sheet of composition C. (The use of the sheet of composition A is not required when the last ply on the carcass is coated with composition B.) The thus prepared tread portion was then joined with the carcass portion by laying the tread portion thereover with the sheet of composition A contacting the ply coated with Composition A and vulcanizing in a mold at a temperature of 160° C for 50 minutes.

There was no tendency of the tread to detach from the carcass when the thus produced tire was tested on a road-wheel at 60 km/hour under a 600 kg load.

TABLE 5

| Composition | A | B | C | D |
|---|---|---|---|---|
| Natural rubber (smoked sheet) ML (1+4) 100° C.=40 | 100 | 100 |  |  |
| Brominated (2.35% wt.) isobutene-isoprene copolymer ML (1+4) 100° C.=43; residual unsaturation=1% |  |  | 100 |  |
| Ethylene/propylene (44%)/5-methyltetra-hydroindene (4%); ML (1+4) 100° C.=100 |  |  |  | 65 |
| Branched polyalkylbenzenes (Preadix 8) |  |  |  | 35 |
| SRF carbon black |  | 25 |  |  |
| HAF carbon black | 50 |  |  |  |
| MT carbon black |  |  | 50 |  |
| ISAF carbon black |  |  |  | 55 |
| Magnesium oxide |  |  | 5 |  |
| Zinc oxide | 5 | 1 | 5 | 5 |
| 2,2'-methylenbis-(4-methyl-6)-(tert. butylphenol) (antioxidant) | 1 |  |  |  |
| Phenylbetanaphthylamine |  | 1 |  |  |
| Stearic acid | 1 | 1 | 1 | 0.5 |
| Pine tar |  | 1 |  |  |
| Amberol ST 137-X (*) |  | 7 |  |  |
| Diorthotolylguanidine |  | 0.75 |  |  |
| Pentalyn A** |  | 3 |  |  |
| Tetramethylthiuramdisulfide |  |  | 1 | 1 |
| N-cyclohexyl-2-benzothiazolesulfonamide | 2.5 | 0.15 |  |  |
| Sulfur | 1.2 | 2.8 | 2.5 | 2 |
| Mercaptobenzothiazole |  |  | 0.5 | 0.5 |

* Commercial product of Rohm & Haas.
** Commercial product of Hercules Powder Co.

Variations and modifications can, of course, be made without departing from the spirit and scope of the invention.

Having thus described our invention, what we desire to secure by Letters Patent and hereby claim is:

1. A process for preparing a composite vehicle tire which comprises bonding (1) a tread portion consisting essentially of a vulcanizable composition comprising (a) a low-unsaturation terpolymer of ethylene with from about 30 – 70 mol percent of propylene and from about 0.5 – 10 mol percent of an unconjugated diolefin, (b) from about 30 to 200 parts by weight, per 100 parts of said terpolymer, of a carbon black reinforcing filler, and (c) a vulcanizing amount of a vulcanizing agent comprising sulfur and an accelerator with (2) a carcass portion consisting essentially of a vulcanizable composition comprising (a) natural rubber, (b) from about 30 to 200 parts by weight, per 100 parts of said rubber, of a carbon black reinforcing filler, and (c) a vulcanizing amount of a vulcanizing agent comprising sulfur and an accelerator, said process comprising interposing between layers of compositions (1) and (2) a layer of (3) a vulcanizable composition comprising (a) a brominated copolymer of isobutene with from about 0.5 – 5 percent by weight of isoprene, said brominated copolymer having a bromine content of from about 1 to 6 percent by weight, (b) from about 30 to 200 parts by weight, per 100 parts of said brominated copolymer, of carbon black reinforcing filler, and (c) a vulcanizing amount of a vulcanizing agent comprising sulfur and an accelerator, said carbon black reinforcing filler in said composition (3) having a lower degree of activity than said carbon black in said compositions (1) and (2), bringing said layers (1), (2) and (3) into surface-to-surface contact, and then heating, under pressure, at a temperature of about 130° – 210° C to thereby covulcanize said layers in contact with each other and obtain a high degree of adhesion therebetween.

2. The process of claim 1 wherein said unconjugated diolefin is selected from the group consisting of cyclopentadiene; dicyclopentadiene; 2-methyl-pentadiene-1,4; hexadiene-1,4; cyclooctadiene-1,5; 5-methyl-tetrahydroindene; 2-methylen-5-norbornene; norbornadiene; hexadiene-1,5; cyclododecatriene-1,5,9 and heptadiene-1,6.

3. The process of claim 1 wherein said terpolymer is a terpolymer of ethylene, propylene and 5-methyl-tetrahydroindene.

4. A composite tire produced by the process of claim 1.

* * * * *

UNITED STATES PATENT …

CERTIFICATE OF CORRECTION

Patent No. 3,712,360                  Dated January 20, 1973

Inventor(s) LUIGI TORTI and GUIDO BERTELLI

It is certified that error appears in the above-identified patent and that said Letters Patent are hereby corrected as shown below:

Title page, left hand column:
"June 26, 1967     Great Britain ......... 29,397/67
June 27, 1967     Japan ................. 40/40812"
          should read
-- June 26, 1967     Great Britain ....... 29,397
   June 27, 1967     Japan ............... 40,812/67 --.
Column 3, line 52: "thermal" structure." should read
-- "thermal") is generally related to its dimensions and structure." --.

Signed and sealed this 25th day of December 1973.

(SEAL)
Attest:

EDWARD M. FLETCHER, JR.            RENE D. TEGTMEYER
Attesting Officer                  Acting Commissioner of Patents